G. C. PHILLIPS.
COTTON PICKING MACHINE.
APPLICATION FILED JAN. 13, 1914.
1,100,908.
Patented June 23, 1914.
2 SHEETS—SHEET 1.
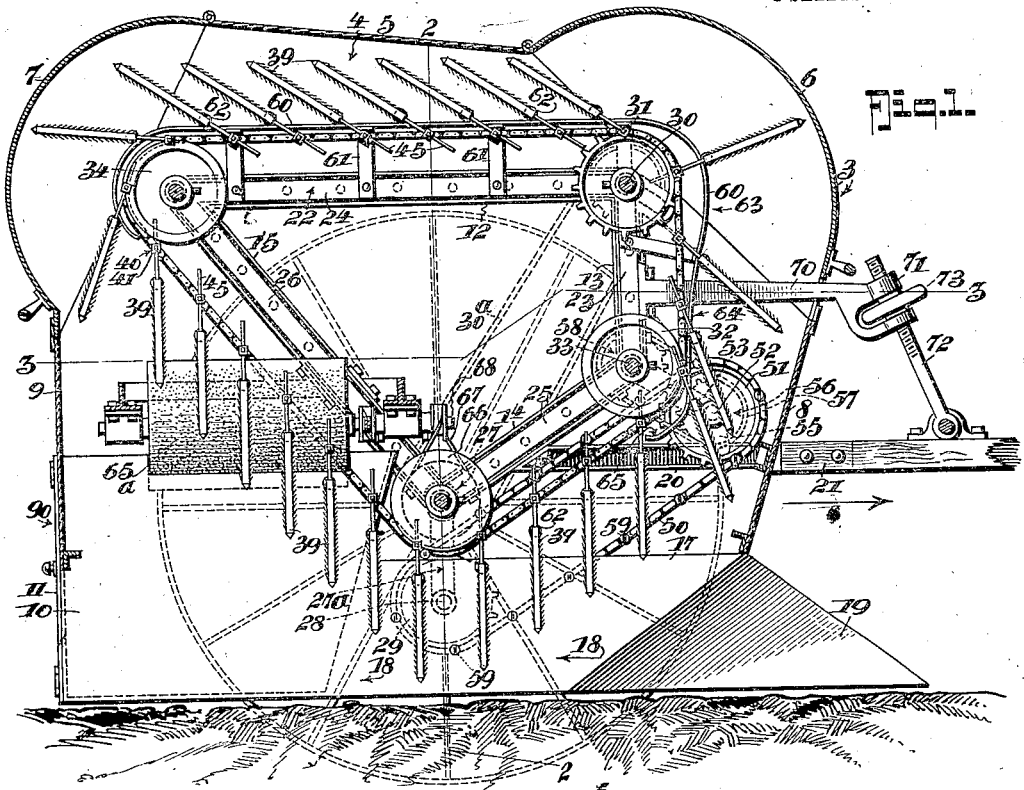
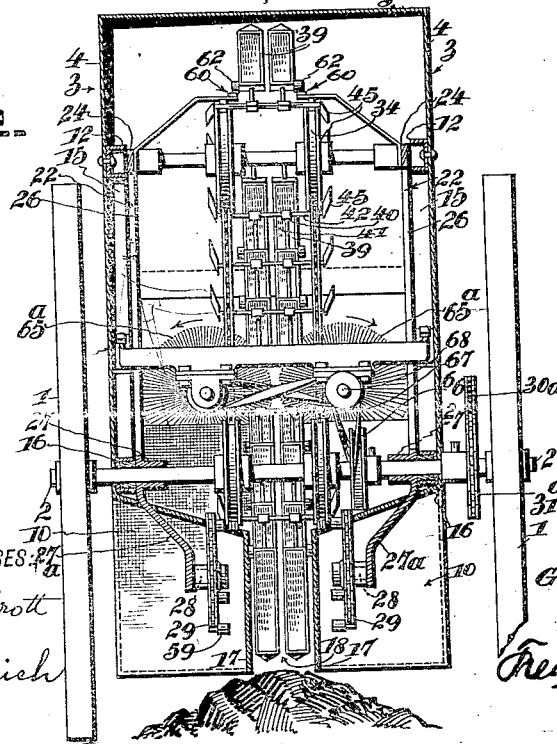
WITNESSES:
John J. Schrott
Mae Immich
INVENTOR
George C. Phillips
BY
Fred G. Dieterich
ATTORNEYS.

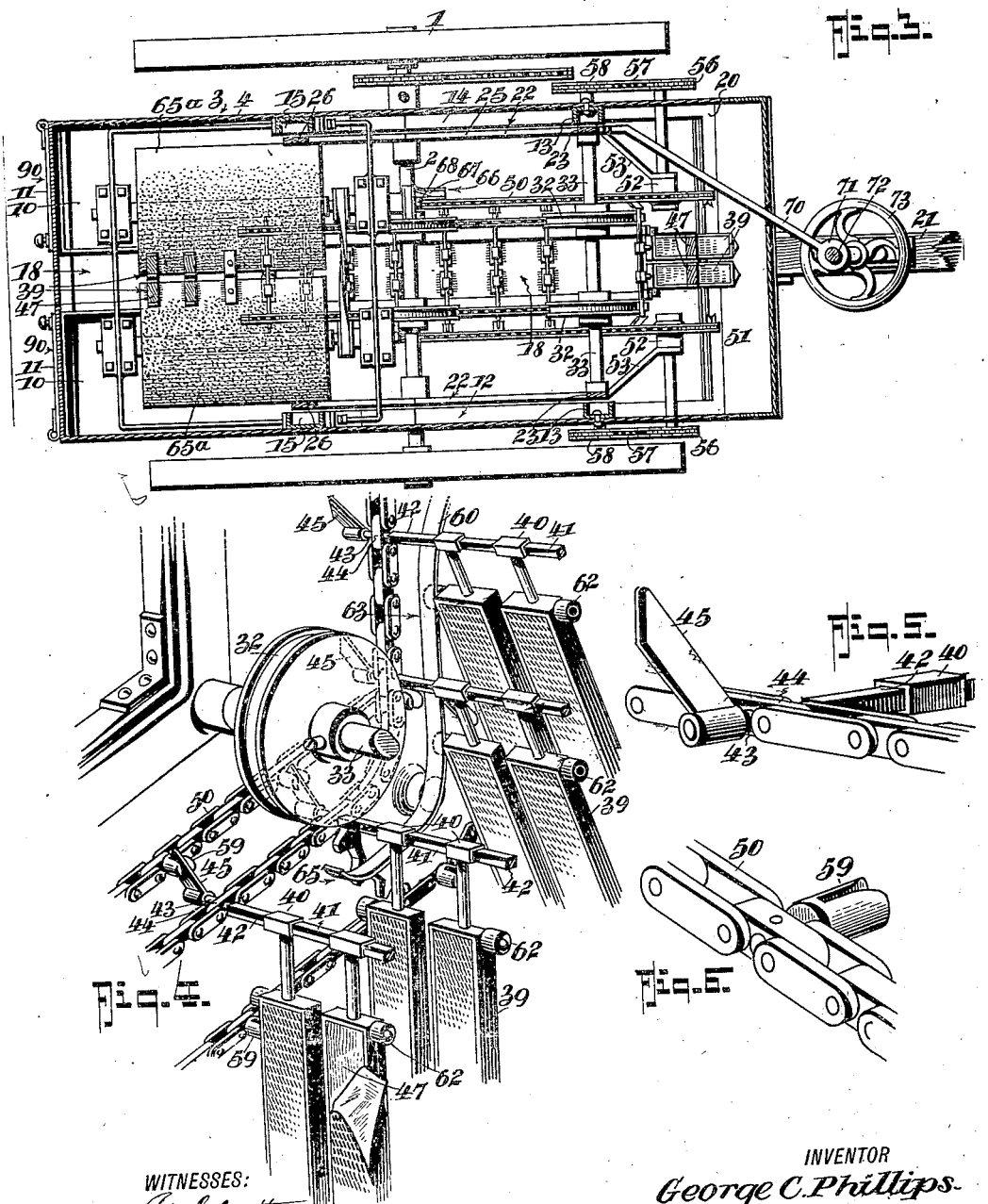

UNITED STATES PATENT OFFICE.

GEORGE C. PHILLIPS, OF BOGALUSA, LOUISIANA.

COTTON-PICKING MACHINE.

1,100,908.
Specification of Letters Patent.
Patented June 23, 1914.

Application filed January 13, 1914. Serial No. 811,825.

*To all whom it may concern:*

Be it known that I, GEORGE C. PHILLIPS, residing at Bogalusa, in the parish of Washington and State of Lousiana, have invented certain new and useful Improvements in Cotton-Picking Machines, of which the following is a specification.

My invention relates to that class of cotton picking machines in which toothed or picker members are included, suitably mounted upon wheeled frames and so arranged, in longitudinal series, whereby to adapt them for contacting with the cotton plants as they travel downwardly and then pass up through the said plants to thereby strip the lint from the bolls and convey the separated and gathered lint into a suitable receptacle provided therefor, and mounted upon the wheeled frame.

My present invention, in its more specific nature, has reference to that type of cotton picking machines clearly disclosed in my copending application, Serial #767,275, filed May 13, 1913, and among other objects it has for its purpose to materially simplify the construction and the arrangement of the parts embodied in my other machine referred to, and to render the operation of picking and gathering the cotton the more uniform and positive.

Another and important feature of my present invention lies in the improved manner in which the endless picker carrier is constructed and arranged in connection with the picker cleaning brushes, whereby the short horizontal travel of the pickers and their lateral engagement with the brushes is avoided and the said pickers caused to engage with the brushing or cleaning elements under a combined lateral and longitudinal wiping action, to thereby subject the said pickers to a more positive cleaning action than can be possibly accomplished with the cleaning means shown and described in my copending application referred to.

Again, my present invention comprehends certain improved features of construction, particularly in the mounting of the framing that sustains the endless picker carrier, for fixedly holding the pickers to the desired position during their vertical descent into and as they pass through the cotton and effect their picking operation on the cotton bolls, and also for adjusting the said frame that the relative spaces between the pickers on the down-going side, as they enter or engage with the cotton plants, may be readily regulated to suit the particular character or grade of cotton to be picked.

With other objects in view, all of which will be hereinafter referred to, my present invention embodies the peculiar construction and novel arrangement of parts hereinafter fully explained, specifically pointed out in the appended claims and illustrated in the accompanying drawings, in which:

Figure 1 is a central longitudinal section of my improved cotton picking machine. Fig. 2 is a cross section thereof taken on the line 2—2 on Fig. 1. Fig. 3 is a horizontal section thereof on the line 3—3 on Fig. 1. Fig. 4 is an enlarged detail perspective of the corner guide sheave on the descending side, illustrating the auxiliary guide chain and its lugs which coöperate with the guide wings on the ends of the picker shafts. Fig. 5 is a detail perspective view showing the wing on one end of the picker shaft. Fig. 6 is a similar view showing one of the guide lugs. Fig. 7 is a detail section of one of the chain links which support one end of a picker shaft illustrating how a slight axial movement is obtained.

In the practical arrangement of the parts that constitute my present improved cotton picking machine, the main framing is supported on the carrier or driving wheels in substantially the same manner as the same appears in my other application before referred to, and the wheeled frame includes a single axle 2 upon which the driving or supporting wheels 1—1 are mounted, and upon which the picker frame, presently fully explained, is rockably mounted.

3 designates a casing that houses the entire picker mechanism, and in my present form of picking mechanism the said casing includes the side walls 4, a top member 5, and front and rear hinged top sections 6 and 7, a pendent and inwardly inclined front wall 8 and a pendent rear wall 9, provided with two openings 90, one at each side of the machine, and through which the gathered lint is withdrawn from the gathering trough or boxes 10—10 presently again referred to.

11—11 designate doors that normally close the openings 90 and form, when closed, a part of the back walls of the boxes 10. The casing 3 is also loosely mounted on the axle

2 and it is fixedly connected to a pair of oppositely disposed side bracing frames formed of channel beams, and as shown they include the upper horizontally disposed sections 12, the front vertically pendent portions 13, the front downwardly and rearwardly extended members 14, and the upwardly and rearwardly inclined rear sections 15.

At the meeting ends of the parts 14—15, the apex end of the frames, the said frames have bearing sleeves 16 that loosely ride upon the cross axle 2, as is best shown in Fig. 2 of the drawings.

The lower ends of opposite side walls 4 of the casing extend inwardly and connect with a pair of pendent inner walls 17—17 that form a restricted passageway 18 in which the plants are received when the machine is drawn along the field and through which the picker elements pass as they engage and pick the cotton bolls.

The walls 17, form, as it were, forward continuations of the inner sides of the gathering boxes, and at their front ends the said walls are divergingly spread to form the side wings 19 that guide the plants into the passageway.

20—20 designate oppositely disposed side braces secured to the front end of the casing and with which connects a tongue 21, it being understood that when the team is hitched to the said tongue the casing will be relatively fixedly held on the axle 2.

The cotton picking mechanism proper, the peculiar construction of which forms the essential feature of my present invention, comprises a pair of oppositely disposed side frames 22 each of which has the shape of the opposite side frames that are secured to the casing 3, as hereinbefore explained, and each includes the front vertically pendent members 23, the top horizontal sections 24, the downwardly and rearwardly inclined sections 25, and the upwardly and rearwardly inclined members 26, the latter and the sections 25 merging with the hub or sleeves 27 that loosely ride on the cross axle 2, as is best shown in Fig. 2, by reference to which and to Fig. 1, it will be also noticed a pendent or hanger member $27^a$ extends from each hub 27 and on the lower ends of which are secured short stub shafts 28 that project inwardly toward each other and on each of which is loosely mounted a chain wheel 29, as shown.

A cross shaft 30 is journaled in the front end of the upper horizontal sections of the frames 22 and upon the said shaft is fixedly mounted a pair of chain wheels 31—31 and these are geared through a chain $30^a$ with the chain wheel $31^a$ fixedly mounted on the driver or cross axle 2, as shown in Fig. 2.

Idler chain wheels 32 are mounted on a cross shaft 33 journaled in the lowermost end of the vertically pendent members of the frames 22 and 34 are like wheels loosely mounted on a cross shaft journaled in the rear ends of the upper members of the frames 22.

A pair of endless sprocket chains pass over the several sets of chain wheels adjacent each side of the frames 22—22 and to which motion is imparted by the chain wheels $31^a$ on the cross axle 2.

The picker members proper 39, in my construction of machine, are arranged in pairs, and each pair of said members is fixedly connected, by means of a sleeve 40, with the squared portion 41, of a cross bar 42, the opposite ends of which are reduced to form journals 43, that are rockably mounted in the solid link members 44 of their respective chains (see Fig. 5 of the drawings) which also shows the outer ends of each cross bar provided with a guide member 45 for engaging with the guide devices presently explained.

Each picker member, as in my other machine referred to, consists of a flat board 47 with a card cloth on the opposite faces thereof, the teeth of which project upwardly at an acute angle to the face of the board, the said cloth face, in practice, is of such character that it will act, as desired, only on cotton lint and dry leaves.

The picker edges of each pair of pickers, are held in transverse alinement, and in practice, are of such width and relatively so spaced that in traveling through the passageway 18, (which is usually about six and one-half inches wide) the said picker edges are about one-half of an inch apart, and spaced a like distance from the side walls of the passageway.

As in my other machine referred to, the picker members in my present machine are so hung from the endless carrier chains, that their faces engage the plants flatwise, that is with their wide or carded faces, and it should be here stated, the said pickers, no matter at what position they may be set, relatively to the chains, are rigidly guided in such position as they pass down into the plants and to the point where they begin to pull up out of the plants; such arrangement being provided to prevent the pickers during the time they are caused to drag straight through and against the plants vertically from being clogged or interfering with each other.

In my present case, I have shown means hereinafter described, for rigidly holding the pickers as they pass down into and back relatively to the machine through the cotton plants to the point of ascension only, the said pickers being allowed to loosely hang in a vertically pendent position from their chains as they rise up from the cotton plants, since the resistance to the pickers and danger of their clogging each other is materially reduced as the pickers rise up from the plants. I desire it understood, however, that where conditions of the crop make it desirable to hold the pickers rigidly to the set positions as they rise out of the plants, means may also be readily applied to that side of the machine for holding the pickers rigid.

The means for holding the pickers rigidly as they pass down into and through the plants in my present showing consists of a pair of auxiliary endless chains 50 that pass over the chain wheels 29 and like chain wheels 51, one of which is mounted on a short stub shaft 52 on a bracket 53 that projects inwardly from the adjacent frame 22, the other wheel being likewise mounted on a shaft 52 journaled in bracket 53 on the opposite frame 22.

Shaft 52 passes through an elongated slot 55 in the adjacent wall of the casing 3 and upon the said shaft is mounted a driven chain wheel 56, around which takes the endless drive chain 57 driven from a chain wheel 58 on the outer or projected end of the cross shaft 33.

The auxiliary chains 50 each, at suitable intervals, have laterally projected guide fingers 59 of the "clothes-pin" shape and they are so positioned on the chains 50, relatively to the movement of the endless picker carrying chains that as the said pickers start on their rearwardly descending movement, (notice Fig. 1,) they pass into position at predetermined times, so that their extensions or wings 45 move into engagement with the slotted pins. To cause the wings 45 and the slotted pins to retain their interlocked position as the pickers travel down into the plants, the auxiliary and the picker chains travel in a substantially parallel plane.

By reason of arranging the auxiliary and the picker chains in the manner shown and described, and by projecting the picker wings 45 at an upwardly and outwardly inclined angle with respect to the picker chain (see Fig. 2) so soon as the pickers approach their lowermost point of travel, by reason of the slotted pins now beginning to travel downwardly and away from the pickers, the said pickers will become disengaged, since their wings 45 pull out of the pins. To prevent binding the pins have a limited rocking motion in their chain links from which they project.

By reason of providing a picker guiding means of the character stated, the construction of my entire machine is simple, and such that it can be economically built.

In my present construction of cotton picking machine, a pair of opposing guide members are provided and they include top portions 60 that are located over the top of the picker devices, as is clearly shown in Figs. 1 and 2, by reference to which, it will be noticed the members 60 are attached to brackets 61 suitably attached to their respective frame sections 22, and they are so extended that the members 60 are projected just over the horizontal portion of the endless picker carrier and to be engaged by friction rollers 62 that project laterally from the outer edge of the inner ends of the pickers.

The guide members 60 extend over the chain guide wheels at the entrance end of the upper or horizontal section of the tiltable frame; over the front end of the said frame, and then down over the front or pendent portion of the said frame, and thence under the front chain wheels located at the lower end of the pendent portion of the tiltable framing.

At the point where they pass over the upper front guide wheels the members 60 are curved outwardly and away from the said front guide wheels, as at 63, and then curved inwardly as at 64 to lie closely over the front face of the lower chain guide wheels, from which point they again curve under the said lower wheels, as at 65, with the said curved portion 65 terminating just in advance of the vertical axis of the said wheels, as shown.

By reason of arranging guides 60 and shaping them as shown, the said guides 60 and the pickers are relatively so disposed that the roller bearings on the adjacent lower edges of each pair of pickers engage the opposing members 60 when the said pickers tend to drop toward the horizontal position, while passing forwardly from the back to the front end of their horizontal travel (see Fig. 1), such coengaging of the pickers and the guides 60 serving to sustain the pickers at their "dropped-back" position, as they pass along their upper or horizontal path of movement.

In passing over the upper chain drive wheels at the front end, the picker members as they swing over and engage the outwardly curved portion of the guides, and as they travel down their vertical path of movement they gradually close toward each other as they reach the final curved ends of the guides 60 whose discharge end is so disposed with relation to the spaced slotted fingers on the auxiliary endless chain, that the wings 45 of the pickers drop into the said fingers as the pickers assume the vertically pendent position (see Fig. 1).

In my other machine, disclosed in my copending application, the pickers on the upgoing side are deflected to travel, for a short distance in the horizontal plane as they complete their backward travel, and during such movement they pass between and engage a pair of opposing wipers or brushes.

In my present case, I arrange the brushing or cleaning devices so that there is little or no retarding action of the endless carrier, while the pickers are subjected to a thorough wiping action as they pass through the cleaning brushes. To such end, I place the cleaning brushes 65 on the up-going picker mechanism, and arrange them horizontally across the path of the up-going movement of the pickers.

By arranging the cleaning brushes, it is not necessary to deflect the upward movement of the pickers and further a more thorough engagement of the brushes and the pickers is provided for, since the pickers enter between the wiping faces of the brushes with their inner or butt ends first and in passing up the brushes are pulled diagonally upward therethrough, thus getting the benefit of a combined lateral and longitudinal drag of the pickers as they are pulled upwardly through the brushes.

The brushes are driven from the pulley 66 on the axle 2, which through the crossed belt 67 drives one shaft 68 of the cleaning brushes, the other shaft of which is driven by a crossed belt, as shown in Fig. 2.

To obtain the best results when mechanically picking cotton, it is necessary that the wiping or picking action on the plant be practically continuous, and that the action of passing the picker members backward be, at least, as fast as the travel of the machine forward over the plant rows, and for such purpose I have arranged the pickers to travel on the different inclines, as shown, as they pass down into the plants, and rise up with the cotton picked from the plants.

By positioning the pickers in the manner stated, the proper spaces between the pickers is maintained as they travel in the upper horizontal plane, and the distance spaces between the pickers is materially decreased as they are lowered to the plants on the incline shown, and such distance spaces still further decreased by having the pickers travel upwardly to the horizontal position on a greater incline as they pass up to the horizontal line of travel. To make this clear, assuming the maximum or normal distance space between the pickers is present when on their horizontal travel, they are two inches apart when on their lesser or front incline, and one and one-half inches apart when traveling up their greatest incline; thereby providing, as it were, an almost constant contact of some of the pickers with the cotton bolls.

In my present invention, I have provided a simple and readily adjustable means for setting the tiltable framing that carries the picker mechanism proper so as to widen or narrow the spaces between the pickers on the descending sides of the carrier as the condition of the crop may make desirable. For such purpose, a bracket arm 70 is secured to one of the side frames 22 that is extended horizontally forwardly and inwardly, its outer end terminating in a bracket having smooth sockets 71 disposed over the draft tongue for receiving the threaded end of a shank 72, the lower end of which is pivotally connected to the tongue.

73 is a screw or hand wheel mounted on the threaded shank that works between the bracketed ends of the member 70, the several parts being so arranged that by turning the hand or screw wheel 73 the tiltable frame with the picker devices can be raised or lowered, it being understood that when lowered from the position shown in Fig. 1, the distance spaces between the pickers on the down-going side are increased and the spaces on the up-going side relatively decreased, and by raising the said frame the distance spaces on the down-going side are lessened while the spaces on the up-going side are correspondingly increased.

From the foregoing taken in connection with the drawings, the complete construction, the manner of operation and the advantages of my present invention are thought to be sufficiently clear to be readily understood by those skilled in the art to which my said invention relates.

While the details of construction disclose a preferred arrangement of parts, I desire it understood that the said parts and the various details may be modified without departing from my invention, as comes within the scope of the appended claims.

What I claim is:

1. In a cotton picking machine, a wheeled vehicle, a frame rockably supported upon the axle of the vehicle to swing in a direction at right angles to the said axle, endless chains mounted upon horizontal axes on the frame and including front and rear inclined portions, picker members pendently supported upon the said chains, a power transmission that couples the chains with the vehicle, means for rigidly holding the chain carrying frame at its rocked adjustments to thereby increase or diminish the relative distance between the picker members on the front or rear inclined portions of the carrying chains.

2. In a cotton picking machine, a wheeled vehicle, a frame rockably supported on the axle of the said vehicle to swing in a direction at right angles to the axle, an endless chain conveyer mounted on the frame and including gears arranged to divide the said conveyer whereby to produce a front vertical section and a rearwardly and downwardly extended section, a rearwardly and upwardly extended section and an upper horizontal section, one of the gears being mounted upon and rotatable with the vehicle axle, picker members pendently supported from the chain conveyer, and means for tilting the rockably mounted frame whereby to change the relative angles of the rearwardly and downwardly and rearwardly and upwardly inclined sections of the endless chain conveyer to thereby vary the distance spaces between the picker members pendent from the said vertical inclined sections of the conveyer.

3. In a cotton picking machine, a carriage adapted to be drawn over the ground, a frame pivotally mounted on the said carriage to swing in a plane at right angles to the axle of the carriage, guides of the said frame, an endless chain conveyer that passes around the said guides, the said endless chain conveyer including a downwardly and rearwardly inclined section and a rearwardly and upwardly inclined section, picker members carried by the said chain conveyer, and means for tilting the rockable frame in different positions of adjustment relatively to the axle upon which it is mounted, whereby to increase or diminish the space between the successive picker members on the downwardly inclined section of the chain conveyer, and accordingly decrease or increase the distance space between the successive picker members on the upwardly inclined section of the chain conveyer.

4. In a cotton picking machine, a carriage adapted to be drawn over the ground, a frame pivotally mounted upon the axle of the said carriage, the said frame being of a substantially triangular shape, guides at the corners of the said frame, an endless chain conveyer that passes around the said guides, picker members carried by the said chain conveyer, means for holding the said frame in different positions of adjustment relatively to the axle upon which it is mounted whereby to increase or diminish the space between the successive picker members on one section of the chain conveyer and accordingly decrease or increase the space between the successive sets of picker members on another section of a chain conveyer according to the position of the said frame, and means for holding the picker members to their spaced positions as they travel through the plants.

5. In a cotton picking machine, a carriage adapted to be drawn over the ground, an angular shaped frame pivotally mounted upon the carriage axle to rock in a plane at right angles to the said axle, chain guides at the corners of the said frame, endless chains passing around the said guides, said chains including a downwardly inclined and upwardly inclined portion, picker members carried by the said chains, means for holding the frame upon which the chains are mounted in different positions of adjustment whereby to change the pitch of the downward and upward positions of the chain relatively to the axle and increase or diminish the space between the successive picker members on the downgoing portion of the chains and accordingly increase or decrease the space between the successive picker members on the upgoing portion of the chain according to the position of the adjustment of the frame and other means for fixedly holding the picker members spaced apart and from engaging with each other as they pass into and through the plants.

6. In a cotton picking machine, a wheeled frame having a restricted passage for receiving the plant stalks, a frame rockably mounted upon the wheels frame axle to swing in the longitudinal direction of the machine, guides at the corners of the said rockable frame, at least one of the said guides being a driver, an endless chain passing over the guides and which includes a downwardly inclined and an upwardly inclined portion, picker members pendently hung on the chain, means for holding the picker members rigidly separated as they pass into the cotton, said means including an endless carrier that travels in parallelism with the downgoing portion of the endless chain, a guide on each picker member that engages and is held interlocked with the members on the carrier, while the picker members travel downwardly into the cotton.

7. In a cotton picker, a wheeled vehicle, a vertically extended frame rockably mounted upon the axle of the wheeled vehicle, an endless chain conveyer mounted on the frame to travel in a direction at right angles to the vehicle axle, power transmission from the said axle geared with the said endless chain conveyer, said conveyer including a downgoing portion that travels toward and into the plants and an upgoing portion that travels out of the plants, means for tilting the frame forwardly or upwardly relatively to the axle to thereby change the pitch or angle of the said downgoing and upgoing portion of the endless conveyer, and picker members pendently supported from the chain conveyer, and means that hold the picker members rigid to their set position as they travel into and out of the cotton plants.

8. In a cotton picking machine, a wheeled vehicle, a frame rockably mounted on the wheeled vehicle to swing in the longitudinal direction of the machine, a guide at each corner of the frame, one of the guides being a driver, an endless chain conveyer that takes over the said guides, picker members hung on the conveyer and adapted for assuming a pendent position as they pass through the plant, means for holding them to their adjusted positions, and cleaner devices for the fingers, the said devices comprising a pair of opposing wiping rolls located in the path of movement of the upgoing picker fingers and adapted for receiving the said fingers between them, the said wiping rolls being fixedly held relatively to the endless finger conveyer.

9. In a cotton picker, a wheeled vehicle movable over the ground, a frame mounted on the vehicle, an endless chain conveyer mounted on the frame, the said conveyer including a downwardly and an upwardly inclined portion, picker fingers pendently and rockably supported on the endless chain conveyer, means for fixedly holding the pickers at their separated positions as they approach into and engage with the plants, said means including a lateral wing on each picker, an endless carrier that moves in parallelism with the picker conveyer where it passes down into the plants, slotted pins projected from the carrier, said pins having a limited rotary movement relatively to the carrier, said carrier and the picker conveyer being coöperatively arranged whereby the wings on the pickers and the slotted pins automatically interlock as they approach the cotton engaging faces and are held interlocked as the pickers are carried down into the cotton.

10. In a cotton picker, a wheeled vehicle movable over the ground, a frame tiltably mounted upon the said vehicle, an endless chain conveyer mounted on the frame, said conveyer including a downwardly and an upwardly inclined portion, picker fingers carried by the chain conveyer, means operative with the chain conveyer for holding the fingers as they enter the plants relatively widely spaced apart and the fingers that pass out of and away from the plants relatively spaced closely together, means for adjusting the frame that carries the chain conveyer whereby to change the relative space between the pickers on the down-going side and the pickers on the up-going side of the chain conveyer, other means for holding the pickers on the other portions of the chain conveyer positively separated, and further means for adjusting the tiltable frame, said means including an arm projected from the said frame having bracket like members provided with smooth apertures, a threaded rod movable through the said apertures and fixedly connected with the vehicle frame, and a screw wheel on the said rod that coacts with the bracket of the projecting arm from the frame.

11. In a cotton picker, a wheeled vehicle mounted over the ground, an endless conveyer, picker fingers carried by the conveyer, means for supporting the conveyer at different inclines throughout its length, and means operative with the conveyer for giving the down-going picker members travel at a speed at least as fast as the travel of the machine over the plant rows.

12. In a cotton picker, a wheeled vehicle, a frame rockably mounted upon the axle of the vehicle to swing in the direction of the machine, an endless chain conveyer mounted upon the frame, chain guides on the frame, one of the chain guides being mounted on the axle of the vehicle for imparting motion to the conveyer, said guides being arranged whereby to form the said endless chain conveyer with a downwardly inclined portion for penetrating the plants and an upwardly inclined portion that moves out of the plants, means for tilting the frame and holding it to its tilted position whereby to change the relative angles of the downgoing and upgoing portions of the endless conveyer, and picker members pendently supported from the conveyer chains, and means that coöperate with the picker members as they pass down into and out of the plants for holding them rigid at their spaced positions.

GEORGE C. PHILLIPS.

Witnesses:
C. L. Johnson,
B. M. McCarty.